(12) United States Patent
Hong et al.

(10) Patent No.: US 8,942,103 B2
(45) Date of Patent: Jan. 27, 2015

(54) APPARATUS AND METHOD FOR WIDEBAND SHORT-RANGE WIRELESS COMMUNICATION

(75) Inventors: Seung Eun Hong, Daejeon (KR); Yong Sun Kim, Daejeon (KR); Woo Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 82 days.

(21) Appl. No.: 13/695,240

(22) PCT Filed: Apr. 29, 2011

(86) PCT No.: PCT/KR2011/003197
§ 371 (c)(1),
(2), (4) Date: Oct. 29, 2012

(87) PCT Pub. No.: WO2011/136605
PCT Pub. Date: Nov. 3, 2011

(65) Prior Publication Data
US 2013/0039180 A1    Feb. 14, 2013

(30) Foreign Application Priority Data

Apr. 29, 2010  (KR) .................. 10-2010-0039789
May 10, 2010  (KR) .................. 10-2010-0043379
Sep. 2, 2010   (KR) .................. 10-2010-0085889
Apr. 28, 2011  (KR) .................. 10-2011-0039942

(51) Int. Cl.
*H04J 1/16*        (2006.01)
*H04W 4/00*        (2009.01)

(52) U.S. Cl.
USPC ............................................. 370/236; 370/328

(58) Field of Classification Search
USPC .................... 370/230, 236, 328, 412
See application file for complete search history.

(56) References Cited

U.S. PATENT DOCUMENTS

| | | | |
|---|---|---|---|
| 2005/0254499 A1 | 11/2005 | Leon et al. | |
| 2007/0121636 A1* | 5/2007 | Kim et al. | 370/392 |
| 2009/0147709 A1* | 6/2009 | Muqattash et al. | 370/310 |
| 2010/0202354 A1* | 8/2010 | Ho | 370/328 |
| 2012/0026921 A1* | 2/2012 | Choi | 370/281 |
| 2012/0033606 A1* | 2/2012 | Chun et al. | 370/315 |
| 2012/0147771 A1* | 6/2012 | Marinier et al. | 370/252 |
| 2012/0195278 A1* | 8/2012 | Heo et al. | 370/329 |
| 2013/0034076 A1* | 2/2013 | Ketchum et al. | 370/329 |
| 2013/0170453 A1* | 7/2013 | Kim et al. | 370/329 |
| 2013/0294337 A1* | 11/2013 | Damnjanovic et al. | 370/328 |
| 2013/0322387 A1* | 12/2013 | Kim et al. | 370/329 |

FOREIGN PATENT DOCUMENTS

| | | |
|---|---|---|
| JP | 2000-201179 A | 7/2000 |
| KR | 2007-0091068 A | 9/2007 |

* cited by examiner

*Primary Examiner* — Andrew Lee
(74) *Attorney, Agent, or Firm* — Rabin & Berdo, P.C.

(57) ABSTRACT

Provided is an apparatus and method for performing wideband short range wireless communication in a millimeter wave band, and the method for wideband short range wireless communication may include checking information of a reception device by performing signaling with the reception device, receiving information about a state of a receive buffer from the reception device based on the information of the reception device, and transmitting data based on the information about a state of the receive buffer.

19 Claims, 10 Drawing Sheets

| b22-b6 | b5-b0 |
|---|---|
| Designated Unit Buffer Octet Size | Number of Unit Buffers |

APPARATUS AND METHOD FOR WIDEBAND SHORT-RANGE WIRELESS COMMUNICATION

TECHNICAL FIELD

The present invention relates to an apparatus and method for performing wideband short range wireless communication in a millimeter wave band, and more particularly, relates to an apparatus and method for enabling a transmission device to transmit data without an overflow of a buffer in a reception device.

BACKGROUND ART

A millimeter wave band corresponding to 57 to 66 GHz may ease a worldwide shortage of frequency resources. A wireless frequency signal of the millimeter wave band is enabled to be implemented and thus, a wireless communication system supporting a transmission rate of several gigabytes is commanding attention in recent times.

Due to a propagation characteristic of the millimeter wave band, the wireless communication system may form an ad-hoc network using nodes dispersedly located in a short range. Dispersed nodes belonging to the ad-hoc network may exchange data using a time division multiple access scheme. For example, a wireless communication network using the millimeter wave band may be configured by a high definition television (HDTV) monitor, a digital video disk (DVD) player, a set-top box (STB), a mobile phone, a computer, and the like. In this instance, devices configuring the wireless communication network may communicate with each other using a wireless millimeter wave frequency.

In a communication scheme where a wireless resource is shared using the time division multiple access scheme, time synchronization may be secured between dispersed nodes sharing the wireless resource since a stable communication service may be provided without interference between the dispersed nodes through the secure of time synchronization. Thus, transmission nodes and reception nodes exchanging data may be aware of a time when data communication occurs between nodes.

In an ultrahigh speed wireless transmission system using the millimeter wave band, a block transmission scheme may be used to enhance a transmission speed of a transmission device. In the block transmission scheme, the transmission device may transmit successive packets without a prompt response with respect to a data packet transmission of a reception device. In the block transmission scheme, it may be important to prevent a buffer overflow from occurring in the reception device.

In ultrahigh speed wireless transmission systems where a transmission speed of more than one gigabyte is possible, overflow of the buffer in the reception device may be likely to occur since packets processed by the reception device may be instantaneously outnumbered by received packets.

Accordingly, there is a desire for a technology for preventing overflow of a buffer in a reception device in ultrahigh speed wireless transmission systems.

DISCLOSURE OF INVENTION

Technical Goals

An aspect of the present invention provides an apparatus and method for limiting a number of packets to be transmitted by a transmission device based on information about an implementation scheme of a receive buffer of a reception device in a wideband short range wireless transmission system where a packet is transmitted in a block transmission scheme.

Another aspect of the present invention provides an apparatus and method for preventing an overflow of a receive buffer by implementing the receive buffer of a reception device by a unit buffer in a wideband short range wireless transmission system where a packet is transmitted in a block transmission scheme.

Still another aspect of the present invention provides an apparatus in which a receive buffer of a reception device is implemented by a unit buffer of a predetermined size and a size of the unit buffer is determined to be various values based on a type of the reception device.

Technical Solutions

According to an aspect of the present invention, there is provided a method for wideband short range wireless communication, the method including checking information of a reception device by performing signaling with the reception device, receiving information about a state of a receive buffer from the reception device based on the information of the reception device, and transmitting data based on the information about a state of the receive buffer.

The information of the reception device may include at least one of a medium access control (MAC) capability and a physical layer (PHY) capability of the reception device.

The checking may include receiving a beacon frame from the reception device and verifying whether the reception device supports a block acknowledgement (ACK) frame based on a beacon message.

The checking may include receiving a beacon frame from the reception device and verifying whether the receive buffer is implemented by a unit buffer of a predetermined size based on a beacon message.

The beacon frame may include an MAC capability information element field.

The MAC capability information element field may include a block ACK buffer element bit.

The MAC capability information element field may include an MAC capability bitmap field, and the MAC capability bitmap field may include a block ACK buffer element bit of a fixed size.

The beacon frame may include an MAC capability information element field, the MAC capability information element field may include an MAC capability bitmap field and an extended MAC capability field, and the extended MAC capability field may include a reserved field and a designated maximum packet octet size exponent field.

When the receive buffer is implemented by a unit buffer of a predetermined size, the receiving of information about a state of the receive buffer comprises receiving a buffer size value and a frame count value to be stored in the receive buffer through the block ACK frame.

The transmitting of data may include dividing the buffer size value by the frame count value and determining a size of the unit buffer.

The transmitting of data may include transmitting the data so that a total number of packets to be transmitted may be less than or equal to the frame count value.

The receiving of information about a state of a receive buffer may include receiving information about an implementation scheme of the receive buffer through a block ACK frame, and the information about an implementation scheme of the receive buffer may indicate whether the receive buffer is implemented by a byte unit or whether the receive buffer is implemented by a unit buffer of a predetermined size.

The receiving of information about a state of a receive buffer may include receiving a size value of the unit buffer and a frame count value indicating a number of currently available unit buffers in the receive buffer through the block ACK frame when the receive buffer is implemented by the unit buffer of a predetermined size, and receiving a buffer size value indicated by a byte unit through the block ACK frame when the receive buffer is implemented by the byte unit.

The block ACK frame may include a receive buffer capability field and a packet acknowledgement response field, and the receive buffer capability field may include a buffer capability mode field indicating an implementation scheme of the receive buffer and a buffer size field indicating information about an available buffer.

When the receive buffer is implemented by a byte unit, the buffer size field may include a buffer octet size field indicated by a byte unit, and when the receive buffer is implemented by a unit buffer of a predetermined size, the buffer size field may include a designated maximum packet octet size field indicating a maximum size for storing a single packet transmitted in block by a transmission device and a frame count field indicating a number of currently available unit buffers.

The transmitting of data may include transmitting the data so that a length of a packet of data may not exceed a value of the designated maximum packet octet size field and a number of transmittable fields may be less than or equal to a value of the frame count field.

When the receive buffer is implemented by a unit buffer of a predetermined size, the buffer size field may include a designated unit buffer octet size field indicating a size of the unit buffer and a number of unit buffers field indicating a number of currently available unit buffers.

The transmitting of data may include sequentially transmitting a plurality of packets corresponding to a number of packets in a case of having a maximum value obtained as a result of dividing a sum of lengths of the plurality of packets to be transmitted by a value of the designated unit buffer octet size field while having a value less than or equal to a value of the number of unit buffers field.

The block ACK frame may include a receive buffer capability field, a block ACK mode field, and a packet acknowledgement field, the receive buffer capability field may include a buffer size field indicating a buffer size by a byte unit and a unit buffer count field indicating a number of currently available unit buffers, and the block ACK mode field may include a block ACK mode indicator field indicating an implementation scheme of the receive buffer and a length of available buffer size field indicating a number of bits assigned to the unit buffer count field.

According to an aspect of the present invention, there is provided a method for wideband short range wireless communication, the method including transmitting information of a reception device requested by a transmission device by performing signaling with the transmission device, detecting information about a state of a receive buffer in the reception device in response to the request of the transmission device, and transmitting the information about a state of a receive buffer.

The information of a reception device may include information about whether the reception device supports a block ACK frame and about an implementation scheme of the receive buffer.

When the reception device supports the block ACK frame, the transmitting of the information about a state of a receive buffer may include transmitting the information about a state of a receive buffer through the block ACK frame.

The information about a state of a receive buffer may include information about an implementation scheme of the receive buffer and may include a buffer size value and a frame count value according to the implementation scheme of the receive buffer.

The block ACK frame may include a receive buffer capability field and a packet ACK response frame, and the receive buffer capability field may include a buffer capability mode field indicating an implementation scheme of the receive buffer and a buffer size field indicating information about an available buffer.

When the receive buffer is implemented by a byte unit, the buffer size field may include a buffer octet size field indicated by a byte unit, and when the receive buffer is implemented by a unit buffer of a predetermined size, the buffer size field may include a designated maximum packet octet size field indicating a maximum size for storing a single packet transmitted in block by the transmission device and a frame count field indicating a number of currently available unit buffers.

When the receive buffer is implemented by a unit buffer of a predetermined size, the buffer size field may include a designated unit buffer octet size field indicating a size of the unit buffer and a number of unit buffers field indicating a number of currently available unit buffers.

According to an aspect of the present invention, there is provided an apparatus for wideband short range wireless communication, the apparatus including a receiver to receive information about a state of a receive buffer based on information of a reception device, a control unit to check the information of a reception device by performing signaling with the reception device and to control an amount of data to be transmitted based on the information about a state of a receive buffer, and a transmitter to transmit data based on the controlled amount of data.

The control unit may determine whether the reception device supports a block ACK frame based on a beacon message received from the reception device.

The control unit may determine whether the receive buffer is implemented by a unit buffer of a predetermined size based on the beacon message received from the reception device.

When the receive buffer is implemented by a unit buffer of a predetermined size, the receiver may receive a buffer size value and a frame count value to be stored in the receive buffer through the block ACK frame.

The control unit may determine a size value of the unit buffer by dividing the buffer size value by the frame count value.

The transmitter may transmit the data so that a length of a single packet of the data may not exceed a size value of the unit buffer and a total number of packets to be transmitted may be less than or equal to the frame count value.

According to an aspect of the present invention, there is provided an apparatus for wideband short range wireless communication, the apparatus including a detector to detect information about a state of a receive buffer of a reception device in response to a request of a transmission device, and a communication unit to transmit information of the reception device requested by the transmission device by performing signaling with the transmission device and transmit the information about a state of the receive buffer.

When the reception device supports the block ACK frame, the communication unit may transmit the information about a state of the receive buffer through the block ACK frame.

Effect of the Invention

According to an aspect of the present invention, it is possible to limit a number of packets to be transmitted by a transmission device based on information about an implementation scheme of a receive buffer of a reception device in a wideband short range wireless transmission system where a packet is transmitted in a block transmission scheme.

According to another aspect of the present invention, it is possible to prevent an overflow of a receive buffer by implementing the receive buffer of a reception device by a unit buffer in a wideband short range wireless transmission system where a packet is transmitted in a block transmission scheme.

According to still another aspect of the present invention, it is possible to provide an apparatus in which a receive buffer of a reception device is implemented by a unit buffer of a predetermined size and a size of the unit buffer is determined to be various values based on a type of the reception device.

The present invention may provide various exemplary embodiments of a block acknowledgement (ACK) frame transmitting information about an implementation scheme of a receive buffer of a reception device.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
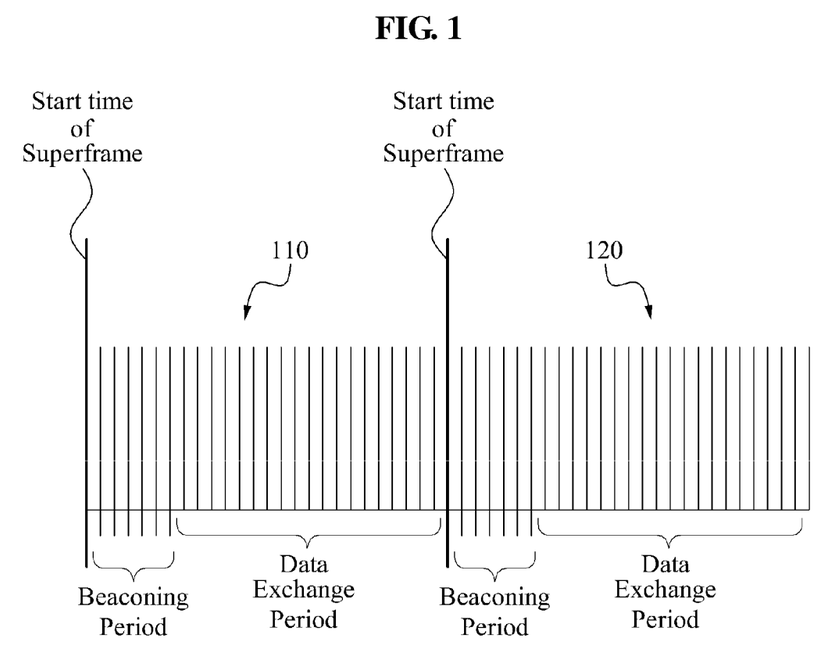
FIG. 1 is a diagram illustrating a configuration of a superframe used for a time division multiple access scheme in a dispersed ad-hoc network.

FIG. 1 is a diagram illustrating a configuration of a superframe used for a time division multiple access scheme in a dispersed ad-hoc network.

The present invention may be based on communication between dispersed nodes configuring an ad-hoc network in a configuration such as a superframe illustrated in FIG. 1. Referring to FIG. 1, a superframe 110 may be configured by time slots of a fixed length and may include a predetermined number of time slots. A superframe 120 may have a similar configuration. The time slots configuring the superframe 110 may be classified into a beaconing period and a data exchange period.

The beaconing period may be configured by initial time slots of the superframe 110 and each of the dispersed nodes may transmit a beacon message including medium access control (MAC) information of each of the dispersed nodes. Remaining slots of the superframe 110 may be used for a data exchange. The superframe 120 may similarly include time slots corresponding to a beaconing period and a data exchange period.

An MAC protocol may enable each node to reserve predetermined slots using the beacon message, and reserved slots may be regulated to be used only by a node reserving the slots. Thus, the time division multiple access scheme may be implemented in the dispersed ad-hoc network.

Figure 2:
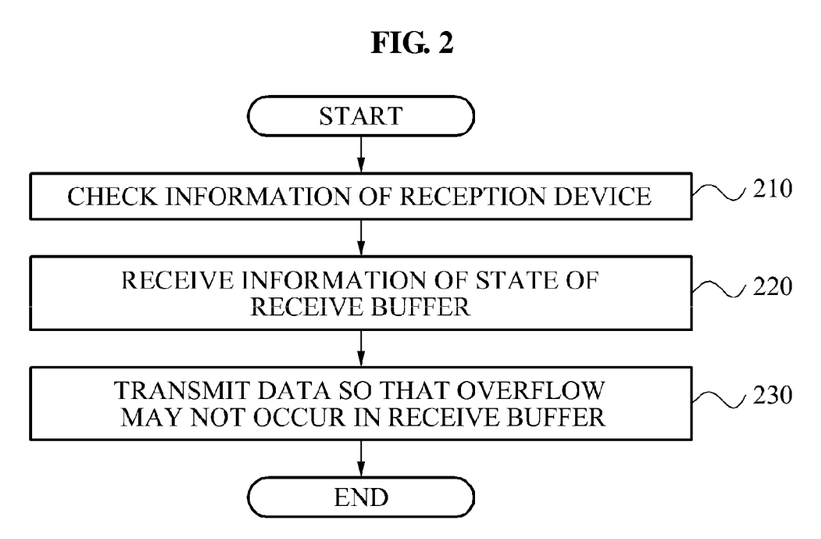
FIG. 2 is a flowchart illustrating a method for wideband short range wireless communication according to an embodiment of the present invention.

FIG. 2 is a flowchart illustrating a method for wideband short range wireless communication according to an embodiment of the present invention. Here, an apparatus for wideband short range wireless communication may correspond to a transmission device. The apparatus for wideband short range wireless communication may indicate a dispersed node belonging to a dispersed ad-hoc network.

In operation 210, the apparatus for wideband short range wireless communication may check information of a reception device by performing signaling with the reception device. The information of the reception device may include at least one of an MAC capability and a physical layer (PHY) capability of the reception device. The MAC capability of the reception device may include whether the reception device supports a block acknowledgement (ACK) frame and an implementation scheme of the receive buffer. The implementation scheme of the receive buffer may be classified into an implementation by a unit buffer of a predetermined size or an implementation by a byte unit.

The apparatus for wideband short range wireless communication may receive a beacon frame from the reception device and may determine whether the reception device supports the block ACK frame based on a beacon message. The apparatus for wideband short range wireless communication may receive a beacon frame from the reception device and may determine whether the receive buffer is implemented by a unit buffer of a predetermined size based on a beacon message. An operation in which the apparatus for wideband short range wireless communication determines an implementation scheme of the receive buffer through the beacon frame will be further described with reference to FIG. 4.

In operation 220, when the reception device supports the block ACK frame, the apparatus for wideband short range wireless communication may request the reception device for the block ACK frame based on the information of the reception device. Thereafter, the apparatus for wideband short range wireless communication may receive information about a state of the receive buffer from the reception device through the block ACK frame.

The information about a state of the receive buffer may include a buffer size value and a frame count value based on an implementation scheme of the receive buffer.

The apparatus for wideband short range wireless communication may receive a size value of the unit buffer and a frame count value indicating a number of currently available unit buffers in the receive buffer through the block ACK frame when the receive buffer is implemented by the unit buffer of a predetermined size. The apparatus for wideband short range wireless communication may receive a buffer size value indicated by a byte unit through the block ACK frame when the receive buffer is implemented by the byte unit.

The information about a state of the receive buffer may include information about an implementation scheme of the receive buffer.

In operation 230, the apparatus for wideband short range wireless communication may control an amount of data to be transmitted based on the information about a state of the receive buffer and may transmit data of the controlled amount so that an overflow may be prevented in the receive buffer.

When the receive buffer is implemented by a byte unit, the apparatus for wideband short range wireless communication may control a packet transmitted in a block unit by a byte unit. In this instance, the apparatus for wideband short range wireless communication may control the packet transmitted in the block unit by the byte unit based on the buffer size value indicated by a byte unit.

When the receive buffer is implemented by a unit buffer of a predetermined size, the apparatus for wideband short range wireless communication may control a packet transmitted in a block unit using a basis of a unit buffer. In this instance, the basis of a unit buffer may indicate a size of the unit buffer and a number of available unit buffers. The size of the unit buffer may be calculated by dividing the buffer size value by the frame count value. The frame count value may be equal to a number of unit buffers.

The apparatus for wideband short range wireless communication may determine a size of the unit buffer by dividing the buffer size value by the frame count value. In this instance, the apparatus for wideband short range wireless communication may transmit data so that a length of a single packet of the data may not exceed a size of the unit buffer and a total number of packets to be transmitted may be less than or equal to the frame count value.

When the receive buffer is implemented by a unit buffer of a predetermined size, the apparatus for wideband short range wireless communication may transmit data so that a length of a single packet of the data may not exceed a designated maximum packet octet size field and a number of transmittable fields may be less than or equal to a value of the frame count field. The designated maximum packet octet size field and the frame count field will be further described with reference to FIG. 5.

When the receive buffer is implemented by a unit buffer of a predetermined size, the apparatus for wideband short range wireless communication may sequentially transmit a plurality of packets corresponding to a number of packets in a case of having a maximum value obtained as a result of dividing a sum of lengths of the plurality of packets to be transmitted by a value of the designated unit buffer octet size field while having a value less than or equal to a value of the number of unit buffers field. The designated unit buffer octet size field and the number of unit buffers field will be further described with reference to FIG. 6.

The apparatus for wideband short range wireless communication may aggregate and transmit a plurality of packets in a single burst of a maximum length. The apparatus for wideband short range wireless communication may reduce an overhead used for a packet transmission by adding a preamble, a PHY header, an MAC header, header protection information used for each packet transmission to a single aggregated burst.

A size of the unit buffer may be variously set according to a usage of the reception device. For example, an image reception device where a transmission packet capacity is relatively small may be implemented by a unit buffer of a small size in comparison with a moving image reception device.

Figure 3:
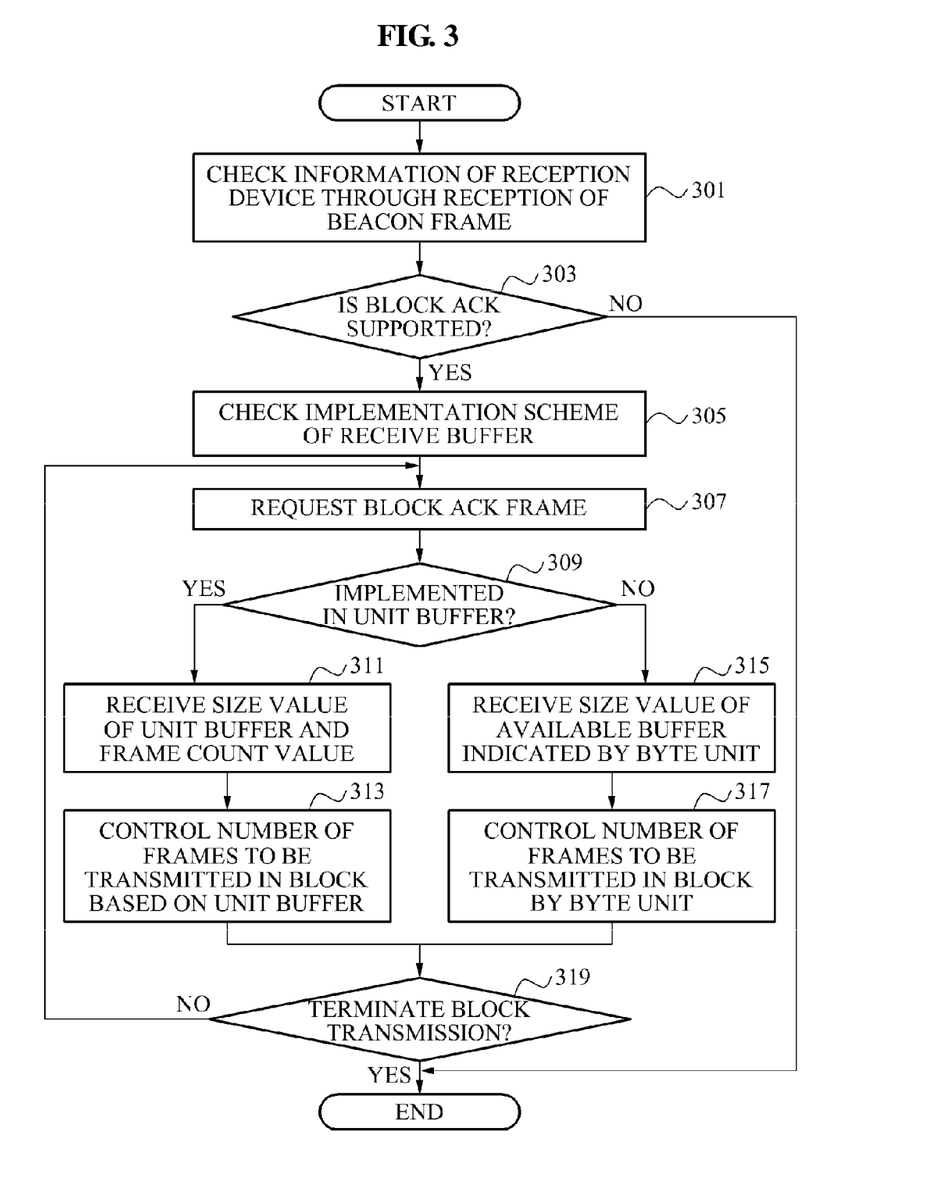
FIG. 3 is a flowchart illustrating a method for wideband short range wireless communication according to another embodiment of the present invention.

FIG. 3 is a flowchart illustrating a method for wideband short range wireless communication according to another embodiment of the present invention.

In operation 301, the apparatus for wideband short range wireless communication may receive a beacon message from a reception device and may check information of the reception device based on the beacon message included in a beacon frame. Information of the reception device may include at least one of an MAC capability and a PHY capability. The MAC capability of the reception device may include information about whether the reception device supports a block ACK scheme and whether a receive buffer of the reception device is implemented in a byte unit or based on a unit buffer. Whether the receive buffer is implemented by a unit buffer may be indicated through a bit assigned to the beacon frame.

In operation 303, the apparatus for wideband short range wireless communication may verify whether the reception device supports the block ACK scheme based on the information of the reception device.

In operation 305, the apparatus for wideband short range wireless communication may check an implementation scheme of the receive buffer of the reception device when the reception device supports the block ACK scheme. The apparatus for wideband short range wireless communication may check an implementation scheme of the receive buffer based on information about a capability of the reception device. Here, the implementation scheme of the receive buffer may be classified into two schemes, that is, a byte unit implementation or an implementation using the unit buffer.

Since the present invention is applied only when the reception device supports the block ACK scheme, the implementation scheme of the receive buffer may not be checked when the reception device does not support the block ACK scheme.

In operation 307, the apparatus for wideband short range wireless communication may request the reception device for the block ACK frame. The block ACK frame of the reception device may include information about an implementation scheme of the receive buffer and information about a size of the receive buffer and a frame count of the receive buffer indicated according to the implementation scheme of the receive buffer.

In operation 309, the apparatus for wideband short range wireless communication may verify whether the receive buffer of the reception device is implemented by the unit buffer. Whether the receive buffer of the reception device is implemented by the unit buffer may be verified based on information of the reception device and may be verified based on information included in the block ACK frame of the reception device.

In operation 311, when the receive buffer of the reception device is implemented by the unit buffer, the apparatus for wideband short range wireless communication may receive a size value of the unit buffer and a frame count value through the block ACK frame. The apparatus for wideband short range wireless communication may receive the size value of the buffer and the frame count value through the block ACK frame, and may divide the size value of the buffer by the frame count value to determine the size value of the unit buffer. The unit buffer may be expressed by a predetermined size value.

In operation 313, the apparatus for wideband short range wireless communication may control a number of frames to be transmitted in a block based on the unit buffer. In this instance, the apparatus for wideband short range wireless communication may prevent an overflow of the receive buffer by causing a maximum value of a length of a packet to be transmitted in a block to be less than or equal to the size value of the unit buffer and by causing the number of frames to be transmitted in a block to be less than or equal to the frame count value.

In operation 315, when the receive buffer is implemented by a byte unit, the apparatus for wideband short range wireless communication may receive the size value of the buffer indicated by the byte unit through the block ACK frame.

In operation 317, the apparatus for wideband short range wireless communication may control the number of frames to be transmitted in a block by a byte unit. In this instance, the apparatus for wideband short range wireless communication may transmit a packet in a block regardless of the maximum value of a length of a packet and a number of packets within a size of the buffer.

In operation 319, the apparatus for wideband short range wireless communication may check a reception state of packets transmitted through the block ACK frame, and may terminate the block transmission when the transmitted packets are successfully received by the reception device. When the transmitted packets are not successfully received, the apparatus for wideband short range wireless communication may request the reception device for the block ACK frame to repeat operations from operation 307.

Figure 4:
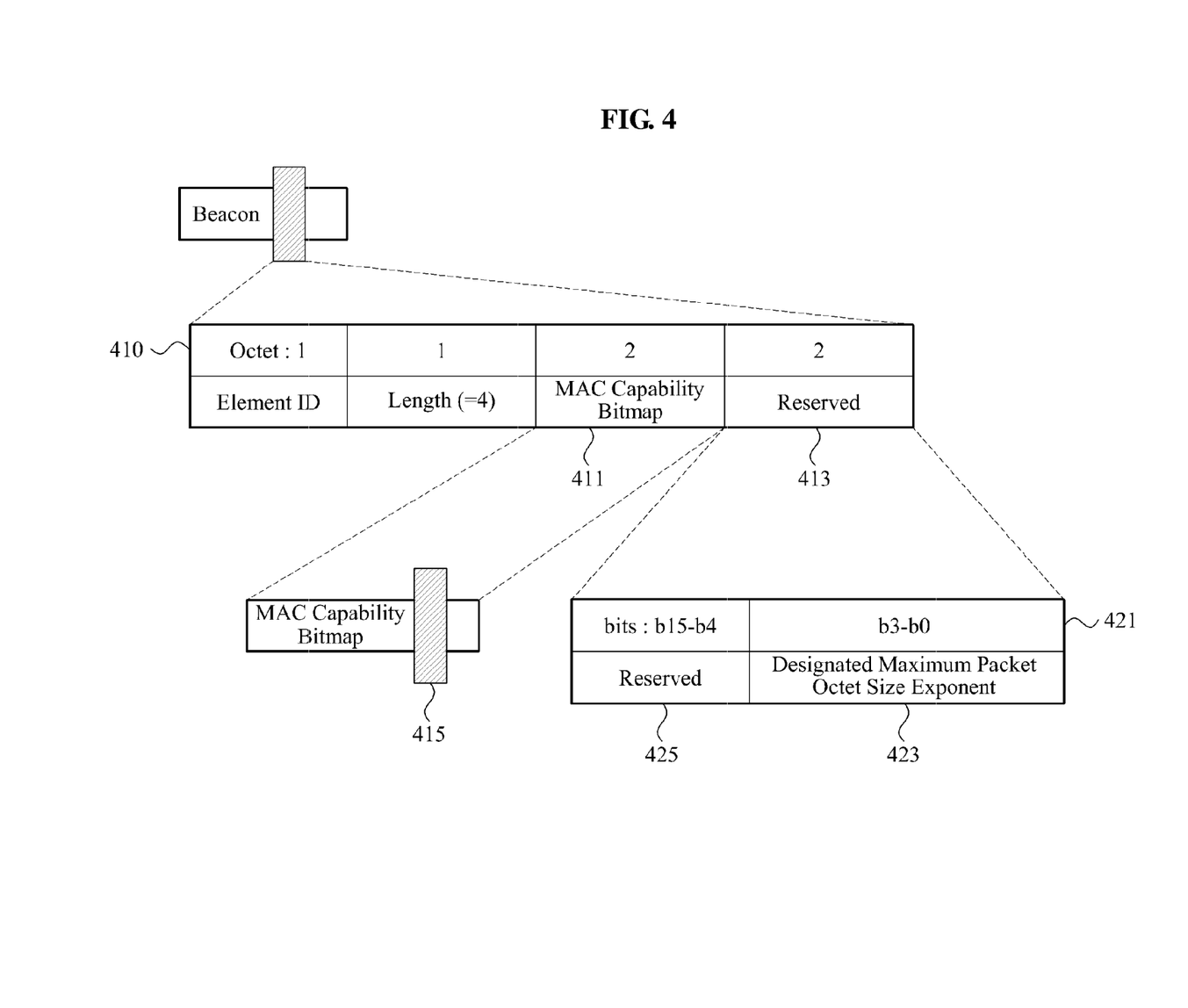
FIG. 4 is a diagram illustrating a beacon frame including information about an implementation scheme of a receive buffer according to an embodiment of the present invention.

FIG. 4 is a diagram illustrating a beacon frame including information about an implementation scheme of a receive buffer according to an embodiment of the present invention.

In general, communication devices may exchange information about an implementation limit and a capability of each of the communication devices before data communication. The foregoing operation may be referred to as a device capability negotiation. The apparatus for wideband short range wireless communication may provide a buffer implementation scheme of a reception device in the device capability negotiation operation. The device capability negotiation may be performed through an exchange of a beacon frame between a transmission device and the reception device. In this instance, each device may be informed of information about a device capability through an MAC capability information element field 410 included in the beacon frame.

The MAC capability information element field 410 may include a block ACK buffer element bit. The block ACK buffer element bit may indicate whether the receive buffer is implemented by a unit buffer of a predetermined size or whether the receive buffer is implemented by a byte unit. Bits assigned to the block ACK buffer element bit may be determined based on a number of implementation schemes of the receive buffer.

The MAC capability information element field 410 may include an element identification (ID) field, an MAC capability bitmap field 411, a reserved field 413, and a length field indicating lengths of the MAC capability bitmap field 411 and the reserved field 413 configured by an octet unit.

One byte may be assigned to the element ID field and the length field, and two bytes may be assigned to the MAC capability bitmap field 411 and the reserved field 413. For example, a value of "4" indicated in the length field may denote a number of bytes assigned to the MAC capability bitmap field 411 and the reserved field 413.

The element ID field may indicate a value assigned to distinguish an information element of a corresponding frame from the beacon frame. The value assigned to distinguish the information element may be set in advance. The MAC capability bitmap field 411 may indicate information about a capability of a device through assigned bits. The reserved field 413 may correspond to a field where a usage is not designated for future use.

A fixed size block ACK buffer element bit 415 may be included in the bits assigned to the MAC capability bitmap field 411. The fixed size block ACK buffer element bit 415 may indicate whether the receive buffer is implemented by the unit buffer of a predetermined size. For example, when "1" is set as the fixed size block ACK buffer element bit 415, it may be possible to indicate the receive buffer is implemented by the unit buffer of a predetermined size.

The reserved field 413 may be used as an extended MAC capability field 421. The extended MAC capability field 421 may be used to provide additional information other than information provided by the MAC capability bitmap field 411.

For example, the extended MAC capability field 421 may include a designated maximum packet octet size exponent field 423 and a reserved field 425. The designated maximum packet octet size exponent field 423 may be used for determining a maximum value of a packet to be transmitted by the transmission device.

The transmission device may determine the maximum value of a packet to be transmitted to be 512×2^ (a value of the designated maximum packet octet size exponent field of the beacon frame) based on a value of the designated maximum packet octet size exponent field 423 of the beacon frame received from the reception device.

When the receive buffer is implemented by the unit buffer, a size of the unit buffer may correspond to a designated maximum packet octet size. The size of the unit buffer may be set to be less than the designated maximum packet octet size depending on a usage of the reception device. For example, an image reception device where a transmission packet capacity is relatively small may be implemented by a unit buffer of a small size in comparison with a moving image reception device.

When the fixed size block ACK buffer element bit 415 indicates that the receive buffer is implemented by the unit buffer of a predetermined size, the designated maximum packet octet size exponent field 423 may be recognized to be a valid value in the transmission device.

Figure 5:
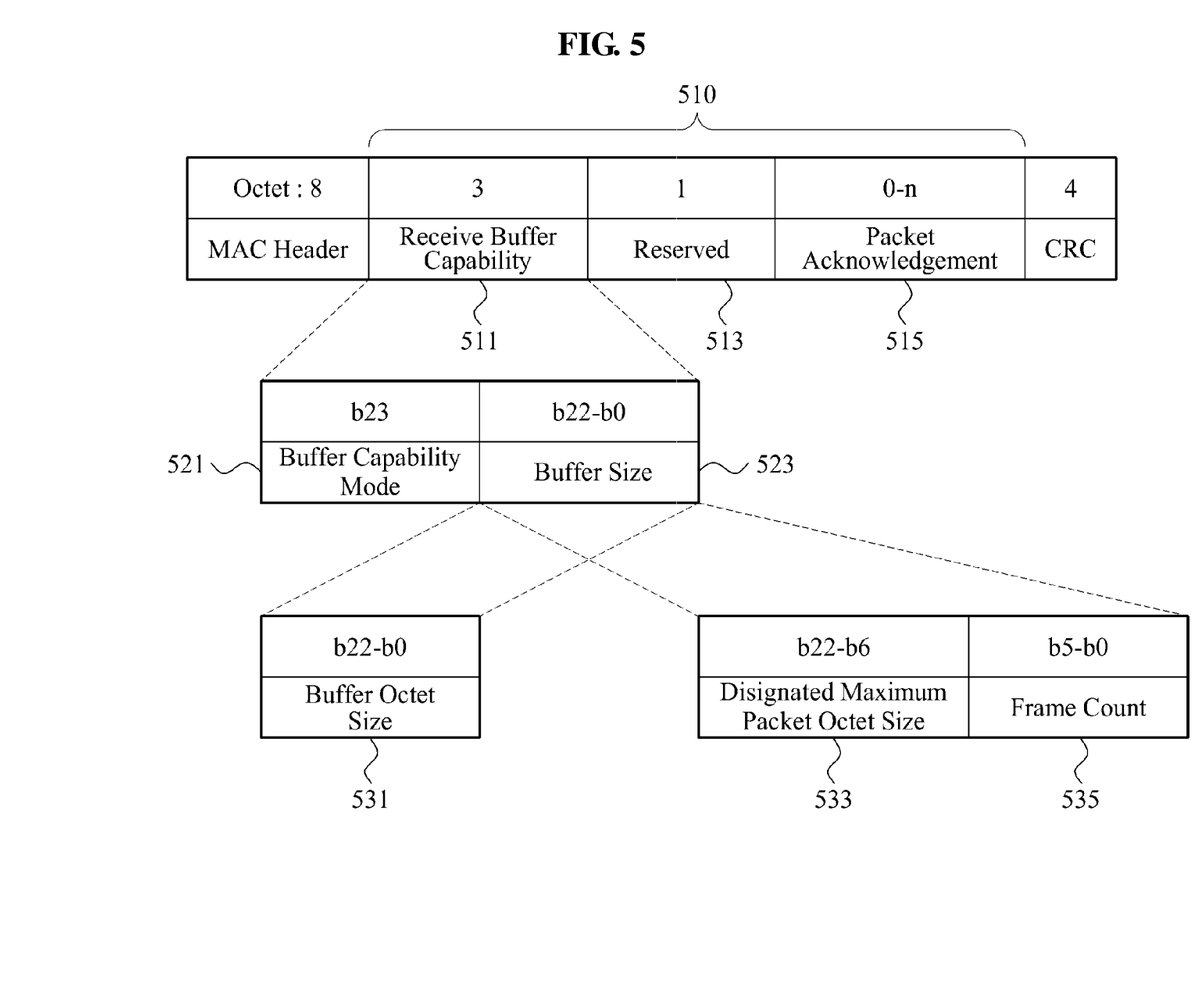
FIG. 5 is a diagram illustrating a configuration of a block acknowledgement (ACK) frame supporting a block transmission scheme according to an embodiment of the present invention.

FIG. 5 is a diagram illustrating a configuration of a block ACK frame supporting a block transmission scheme according to an embodiment of the present invention.

Referring to FIG. 5, the block ACK frame supporting a block transmission scheme according to an embodiment of the present invention may include an MAC header field, a block ACK frame payload field 510, and a cyclic redundancy check (CRC) field configured by an octet unit.

The MAC header field where eight bits are assigned may include information associated with a control of the block ACK frame. The block ACK frame payload field 510 may correspond to a field including data information of the block ACK frame, and may include a receive buffer capability field 511, a reserved field 513, and a packet acknowledgement field 515. The CRC field may correspond to a field for inspecting the integrity of the block ACK frame.

The receive buffer capability field 511 may provide information about an implementation scheme of a receive buffer and information associated with an available buffer in the receive buffer. The receive buffer capability field 511 may include a buffer capability mode field 521 and a buffer size field 523.

The buffer capability mode field 521 may indicate an implementation scheme of the receive buffer. One bit may be assigned to the buffer capability mode field 521, and in this case, for example, a case where a bit assigned to the buffer capability mode field 521 corresponds to "1" may indicate the receive buffer is implemented by a unit buffer. A case where a bit assigned to the buffer capability mode field 521 corresponds to "0" may indicate the receive buffer is implemented by a byte unit. The buffer size field 523 may indicate information about a buffer in the receive buffer. In this instance, 23 bits may be assigned to the buffer size field 523. Furthermore, 23 bits may be extended in comparison with 2 bytes assigned to the buffer size field 523 in a related art.

More particularly, the buffer size field 523 may have a varying depending on an implementation scheme of the receive buffer.

When the receive buffer is implemented by a byte unit, the buffer size field 523 may include a buffer octet size field 531 indicated by a byte unit. When the receive buffer is implemented by the byte unit, the receive buffer may store packets in a byte unit regardless of a number of packets transmitted by a transmission device in a block unit. For example, when the receive buffer is implemented by 65,535 bytes, the receive buffer may store packets within 65,535 bytes regardless of a number of packets transmitted by the transmission device in the block unit.

When the receive buffer is implemented by a unit buffer, the buffer size field 523 may include a designated maximum packet octet size field 533 and a frame count field 535. The designated maximum packet octet size field 533 may indicate a maximum size of storing a single packet transmitted by the transmission device in a block, and the frame count field 535 may indicate a number of currently available unit buffers in the receive buffer. A packet transmitted by the transmission device in a block may generally indicate an MAC service data unit of an MAC layer. A packet transmitted in an aggregation may indicate a service data unit of an MAC layer aggregated.

The transmission device may be enabled to cut a packet of a larger size than a designated maximum packet octet size and transmit a cut fragment to a subsequent unit buffer. Thus, the transmission device may transmit a packet so that an overflow may be prevented in the unit buffer.

For example, when a designated maximum packet octet size corresponds to 1000 bytes and a frame count value corresponds to 10, a size of the unit buffer may correspond to 1000 bytes that is the same as the designated maximum packet octet size. A number of available unit buffers in the reception device may correspond to ten. In the transmission device, a number of frames to be transmitted in a block unit may be limited to ten and a length of a packet to be transmitted in a block at one time may be limited to a maximum of 1000 bytes.

When the reception device is implemented by the unit buffer, a number of bits of the designated maximum packet octet size field 533 and the frame count field 535 may correspond to a value to be determined by a block ACK frame designer, and a device transmitting and receiving a block ACK frame may be assumed to be able to acknowledge the number of bits of the two fields.

The reserved field 513 may correspond to a field where a usage is not designated for a future use. The reserved field 513 may indicate information about a number of bits assigned to the designated maximum packet octet size field 533 and the frame count field 535.

The packet acknowledgement field 515 may correspond to a field indicating whether each of packets included in a block transmission is received, and bytes corresponding to transmission packets may be assigned to the packet acknowledgement field 515.

Figure 6:
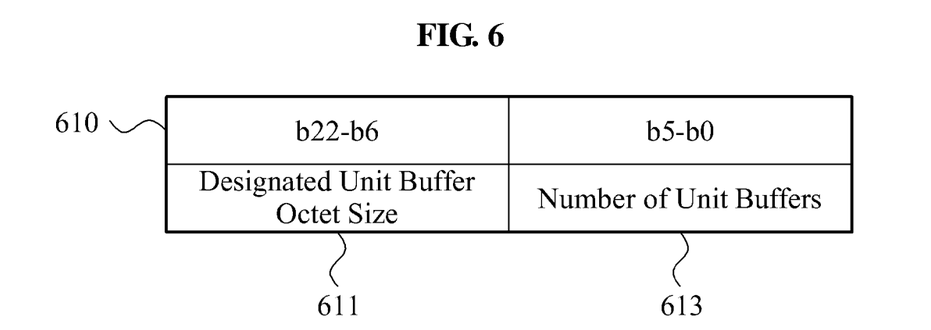
FIG. 6 is a diagram illustrating an example of a buffer size field according to an embodiment of the present invention.

FIG. 6 is a diagram illustrating an example of a buffer size field according to an embodiment of the present invention.

Referring to FIG. 6, when a receive buffer is implemented by a unit buffer, a buffer size field 610 may include a designated unit buffer octet size field 611 and a number of unit buffers field 613.

The designated unit buffer octet size field 611 may directly indicate a size of the unit buffer. The number of unit buffers field 613 may indicate a number of currently available unit buffers among receive buffers.

In this instance, when lengths of packets according to an order of transmissions correspond to $l_1, l_2, \ldots, l_i, \ldots, l_k$, a value of the designated unit buffer octet size field 611 corresponds to UB, and a value of the number of unit buffers field 613 corresponds to nUB, a number of packets nTxPkt to be successively transmitted by a transmission device may be calculated as follows.

$$nT \times Pkt = \underset{k}{\mathrm{argmax}}\left\{\left(\sum_{i=1}^{k}\left\lceil\frac{l_i}{UB}\right\rceil\right) \leq nUB\right\}$$

That is, the number of packets nTxPkt to be successively transmitted may be calculated to be a number of packets k in a case of having a maximum value obtained as a result of dividing a sum of lengths of packets to be transmitted by the transmission device by a value of the designated unit buffer octet size field 611 while having a value less than a value of the number of unit buffers field 613.

When the reception device is implemented by a unit buffer, a number of bits of the designated unit buffer octet size field 611 and the number of unit buffers field 613 may correspond to a value to be determined by a block ACK frame designer, and a device transmitting and receiving a block ACK frame may be assumed to be aware of the number of bits of the two fields. The reserved field 513 of FIG. 5 may be used for indicating information about a number of bits assigned to the designated unit buffer octet size field 611 and the number of unit buffers field 613.

The transmission device may be enabled to cut a packet of a larger size than a designated unit buffer octet size and transmit a cut fragment to a subsequent unit buffer. Thus, the transmission device may transmit a packet so that an overflow may be prevented in the unit buffer.

Figure 7:
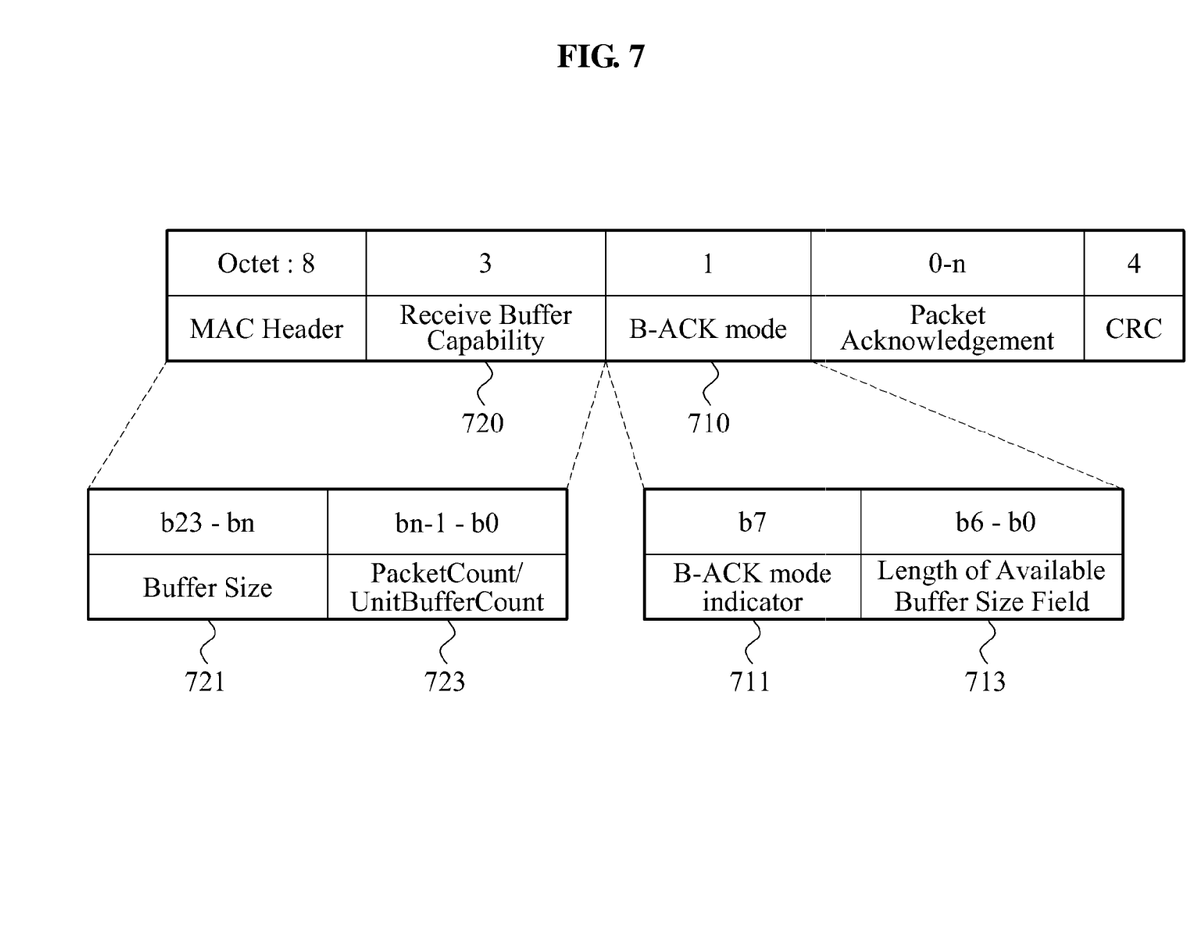
FIG. 7 is a diagram illustrating another configuration of a block ACK frame supporting a block transmission scheme according to an embodiment of the present invention.

FIG. 7 is a diagram illustrating another configuration of a block ACK frame supporting a block transmission scheme according to an embodiment of the present invention.

Referring to FIG. 7, the block ACK frame supporting a block transmission scheme according to an embodiment of the present invention may include an MAC header field, a block ACK frame payload field, and a CRC field configured by an octet unit.

The block ACK frame payload field may include a block ACK mode field 710, a receive buffer capability field 720, and a packet acknowledgement field.

The block ACK mode field 710 may include a block ACK mode indicator field 711 and a length of available buffer size field 713.

The block ACK mode indicator field 711 may indicate an implementation scheme of the receive buffer and one bit may be assigned to the block ACK mode indicator field 711. For example, when a bit assigned to the block ACK mode indicator field 711 corresponds to "1," it may be possible to indicate the receive buffer is implemented by a unit buffer. When a bit assigned to the block ACK mode indicator field 711 corresponds to "0," it may be possible to indicate the receive buffer is implemented by a byte unit.

The length of available buffer size field 713 may indicate a number of bits assigned to a buffer size field 721 and a packet count field/unit buffer count field 723 configuring the receive buffer capability field 720.

The buffer size field 721 may indicate a size of a buffer by a byte unit.

The packet count field/unit buffer cont field 723 may indicate available buffers among receive buffers in a number of packets/a number of unit buffers.

When the receive buffer is implemented by a byte unit, the transmission device may transmit packets in a block unit based on a value of the buffer size field 721. When the receive buffer is implemented by a unit buffer, the transmission device may transmit packets in a block unit based on a unit buffer size and the packet count field/unit buffer count field 723. In this instance, the unit buffer size may be calculated by dividing a value of the buffer size field 721 by a value of the packet count field/unit buffer count field 723.

The transmission device may be enabled to cut a packet of a larger size than a size of the unit buffer and transmit a cut fragment to a subsequent unit buffer. Thus, the transmission device may transmit a packet so that an overflow may be prevented in the unit buffer.

Figure 8:
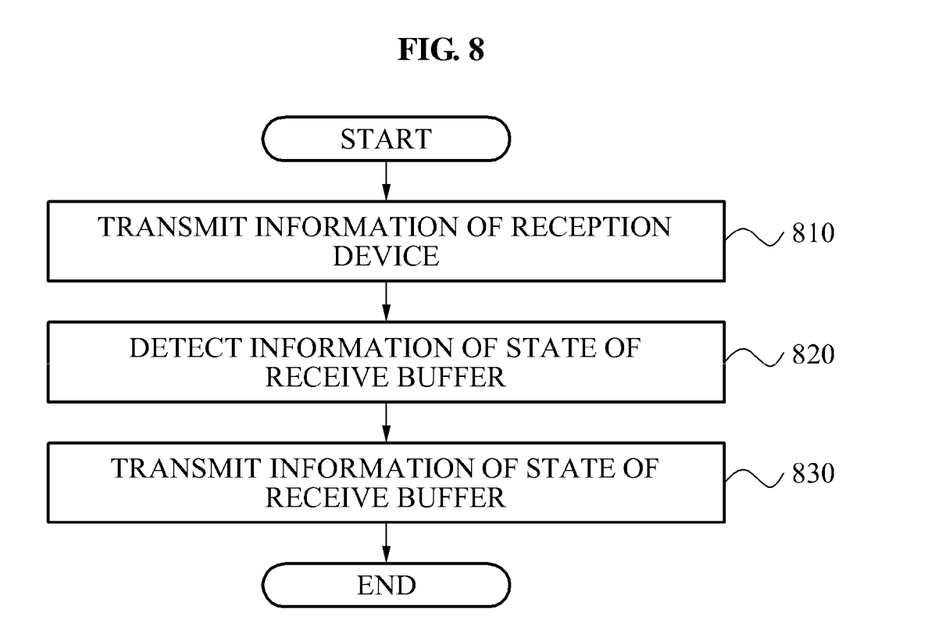
FIG. 8 is a flowchart illustrating a method for wideband short range wireless communication according to an embodiment of the present invention.

FIG. 8 is a flowchart illustrating a method for wideband short range wireless communication according to an embodiment of the present invention. Here, an apparatus for wideband short range wireless communication may correspond to a reception device.

In operation 810, the apparatus for wideband short range wireless communication may transmit information of the reception device requested by a transmission device by performing signaling with the transmission device. The apparatus for wideband short range wireless communication may perform signaling with the transmission device through a beacon frame. The information of the reception device may include at least one of an MAC capability and a PHY capability. The MAC capability of the reception device may include information about whether the reception device supports a block ACK frame and information about an implementation scheme of a receive buffer of the reception device.

In operation 820, the apparatus for wideband short range wireless communication may detect information about a state of the receive buffer of the reception device in response to the request of the transmission device. When the reception device supports the block ACK frame, the transmission device may request the reception device for the block ACK frame. The information about a state of the receive buffer may include information about the implementation scheme of the receive buffer and include a buffer size value and a frame count value according to the implementation scheme of the receive buffer.

In operation 830, the apparatus for wideband short range wireless communication may transmit the information about a state of the receive buffer through the block ACK frame.

The block ACK frame may include a receive buffer capability field and a packet acknowledgement field. The receive buffer capability field may include a buffer capability mode field indicating an implementation scheme of the receive buffer and a buffer size field indicating information about an available buffer among receive buffers.

When the receive buffer is implemented by a byte unit, the buffer size field may include a buffer octet size field indicated by a byte unit.

When the receive buffer is implemented by a unit buffer of a predetermined size, the buffer size field may include a designated maximum packet octet size field and a frame count field. The designated maximum packet octet size field may indicate a maximum size of storing a single packet transmitted by the transmission device in a block, and the frame count field may indicate a number of currently available unit buffers.

When the receive buffer is implemented by a unit buffer of a predetermined size, the buffer size field may include a designated unit buffer octet size field and a number of unit buffers field. The designated unit buffer octet size field may indicate a size of the unit buffer, and the number of unit buffers field may indicate a number of currently available unit buffers.

Figure 9:
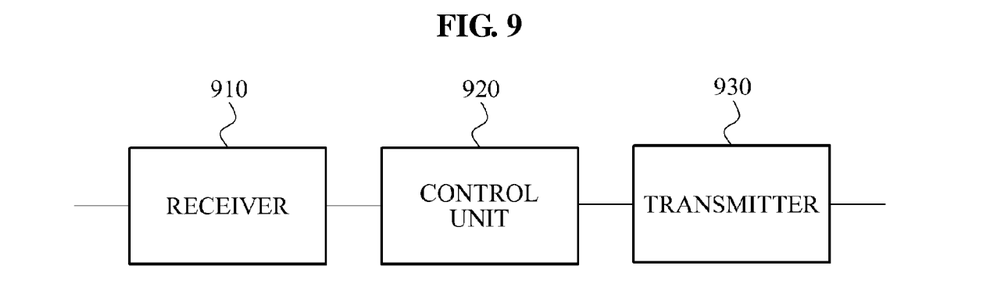
FIG. 9 is a block diagram illustrating an apparatus for wideband short range wireless communication according to an embodiment of the present invention.

FIG. 9 is a block diagram illustrating an apparatus for wideband short range wireless communication according to an embodiment of the present invention. Referring to FIG. 9, the apparatus for wideband short range wireless communication according to an embodiment may include a receiver 910, a control unit 920, and a transmitter 930.

The receiver 910 may receive information about a state of a receive buffer from a reception device based on information of the reception device. The information about a state of the receive buffer may include a buffer size value and a frame count value according to an implementation scheme of the receive buffer.

When the receive buffer is implemented by a unit buffer of a predetermined size, the receiver 910 may receive a buffer size value and a frame count value to be stored in the receive buffer through a block ACK frame.

The receiver 910 may receive the information about a state of the receive buffer through the block ACK frame. In this instance, the information about a state of the receive buffer may be received by various fields configuring the block ACK frame. The various fields configuring the block ACK frame may be configured as described with reference to FIG. 5 through FIG. 7.

The control unit 920 may check the information of the reception device by performing signaling with the reception device, and may control an amount of data to be transmitted based on the information about a state of the receive buffer. The information of the reception device may include at least one of an MAC capability and a PHY capability. The MAC capability of the reception device may include whether the reception device supports a block ACK frame and an implementation scheme of the receive buffer. The implementation scheme of the receive buffer may be classified into an implementation by a unit buffer of a predetermined size or an implementation by a byte unit.

The control unit 920 may verify whether the reception device supports the block ACK frame based on a beacon message received from the reception device.

The control unit 920 may verify whether the receive buffer is implemented by a unit buffer based on the beacon message received from the reception device.

When the receive buffer is implemented by a unit buffer of a predetermined size, the control unit 920 may determine a size of the unit buffer by dividing a buffer size value by a frame count value.

When the receive buffer is implemented by a unit buffer of a predetermined size, the control unit 920 may control a length of a packet and a number of packets transmitted in a block unit based on a size of the unit buffer and a number of unit buffers. The number of unit buffers may be identical to the frame count value. The control unit 920 may prevent an overflow from occurring in the receive buffer by controlling a length of a packet transmitted in a block unit to not exceed a size of the unit buffer and controlling a number of packets to not exceed a number of unit buffers.

When the receive buffer is implemented by a byte unit, the control unit 920 may control a length of a packet transmitted in a block unit based on a size value of a buffer indicated by a byte unit. In this instance, the control unit 920 may control a length of a packet transmitted in a block unit to not exceed a size value of the buffer irrespective of the number of packets.

When the reception device supports the block ACK, the transmitter 930 may request the reception device for the block ACK frame.

The transmitter 930 may transmit data so that a length of a single packet of the data may not exceed a size of the unit buffer and a total number of packets to be transmitted may be less than or equal to the frame count value.

The transmitter 930 may transmit data so that an overflow may be prevented in the reception buffer based on an amount of data controlled by the control unit 920.

Figure 10:
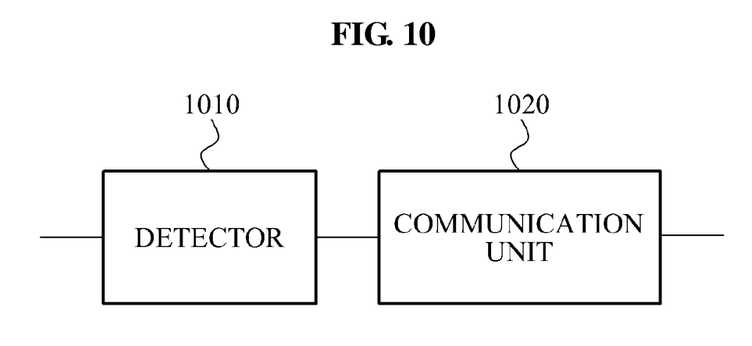
FIG. 10 is a block diagram illustrating an apparatus for wideband short range wireless communication according to another embodiment of the present invention.

FIG. 10 is a block diagram illustrating an apparatus for wideband short range wireless communication according to another embodiment of the present invention. Referring to FIG. 10, the apparatus for wideband short range wireless communication according to an embodiment may include a detector 1010 and a communication unit 1020.

The detector 1010 may detect information about a state of a receive buffer of a reception device in response to a request of a transmission device. When the reception device supports a block ACK frame, the transmission device may request the reception device for the block ACK frame. The information about a state of the receive buffer may include information about an implementation scheme of the receive buffer and include a buffer size value and a frame count value according to the implementation scheme of the receive buffer.

The communication unit 1020 may transmit information of the reception device requested by the transmission device by performing signaling with the transmission device. The communication unit 1020 may perform signaling with the transmission device through a beacon frame. The communication unit 1020 may transmit the information of the reception device to the reception device through the beacon frame. The information of the reception device may include information about whether the reception device supports the block ACK frame and about the implementation scheme of the reception buffer.

The communication unit 1020 may receive signal requesting the block ACK frame from the transmission device. The communication unit 1020 may transmit the information about a state of the receive buffer through the block ACK frame in response to a request for the block ACK frame. The information about a state of the receive buffer may be transmitted through various fields configuring the block ACK frame. Various fields configuring the block ACK frame may be configured as described with reference to FIG. 5 through FIG. 7.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the well-known variety and available to those having skill in the computer software arts.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for wideband short range wireless communication, the method comprising:
checking information of a reception device by performing signaling with the reception device;
receiving information about a state of a receive buffer from the reception device based on the information of the reception device; and
transmitting data based on the information about a state of the receive buffer;
wherein the checking comprises receiving a beacon frame from the reception device and verifying whether the receive buffer is implemented by a unit buffer of a predetermined size based on a beacon message.

2. The method of claim 1, wherein the information of the reception device includes at least one of a medium access control (MAC) capability and a physical layer (PHY) capability of the reception device.

3. The method of claim 1, wherein the checking comprises receiving a beacon frame from the reception device and verifying whether the reception device supports a block acknowledgement (ACK) frame based on a beacon message.

4. The method of claim 1, wherein the beacon frame includes an MAC capability information element field.

5. The method of claim 4, wherein:
the MAC capability information element field includes an MAC capability bitmap field, and
the MAC capability bitmap field includes a block ACK buffer element bit of a fixed size.

6. The method of claim 4, wherein the MAC capability information element field includes a block ACK buffer element bit.

7. The method of claim 1, wherein:
the beacon frame includes an MAC capability information element field,
the MAC capability information element field includes an MAC capability bitmap field and an extended MAC capability field, and
the extended MAC capability field includes a reserved field and a designated maximum packet octet size exponent field.

8. The method of claim 1, wherein, when the receive buffer is implemented by a unit buffer of a predetermined size, the receiving of information about a state of the receive buffer comprises receiving a buffer size value and a frame count value to be stored in the receive buffer through the block ACK frame.

9. The method of claim 8, wherein the transmitting of data comprises dividing the buffer size value by the frame count value and determining a size value of the unit buffer.

10. The method of claim 9, wherein the transmitting of data comprises transmitting the data so that a total number of packets to be transmitted is less than or equal to the frame count value.

11. A method for wideband short range wireless communication, the method comprising:
transmitting information of a reception device requested by a transmission device by performing signaling with the transmission device;
detecting information about a state of a receive buffer of the reception device in response to the request of the transmission device; and
transmitting the information about a state of a receive buffer;
wherein the information indicates whether the receive buffer is implemented by a unit buffer of a predetermined size.

12. The method of claim 11, wherein the information of a reception device includes information about whether the reception device supports a block acknowledgement (ACK) frame and about an implementation scheme of the receive buffer.

13. The method of claim 12, wherein, when the reception device supports the block ACK frame, the transmitting of the information about a state of a receive buffer comprises transmitting the information about a state of a receive buffer through the block ACK frame.

14. The method of claim 11, wherein the information about a state of a receive buffer includes information about an implementation scheme of the receive buffer and includes a buffer size value and a frame count value according to the implementation scheme of the receive buffer.

15. The method of claim 13, wherein:
the block ACK frame includes a receive buffer capability field and a packet acknowledgement response frame, and
the receive buffer capability field includes a buffer capability mode field indicating an implementation scheme of the receive buffer and a buffer size field indicating information about an available buffer.

16. The method of claim 15, wherein:
when the receive buffer is implemented by a byte unit, the buffer size field includes a buffer octet size field indicated by a byte unit, and
when the receive buffer is implemented by a unit buffer of a predetermined size, the buffer size field includes a designated maximum packet octet size field indicating a maximum size for storing a single packet transmitted in block by the transmission device and a frame count field indicating a number of currently available unit buffers.

17. The method of claim 15, wherein, when the receive buffer is implemented by a unit buffer of a predetermined size, the buffer size field includes a designated unit buffer octet size field indicating a size of the unit buffer and a number of unit buffers field indicating a number of currently available unit buffers.

18. An apparatus for wideband short range wireless communication, the apparatus comprising:
a receiver to receive information about a state of a receive buffer based on information of a reception device;
a control unit to check the information of a reception device by performing signaling with the reception device and to control an amount of data to be transmitted based on the information about a state of a receive buffer; and
a transmitter to transmit data based on the controlled amount of data;
wherein the information indicates whether the receive buffer is implemented by a unit buffer of a predetermined size.

19. The apparatus of claim 18, wherein the control unit determines whether the reception device supports a block ACK frame based on a beacon message received from the reception device.

* * * * *